R. B. ROBBINS.
Corn-Harvesters.
No. 149,064. Patented March 31, 1874.
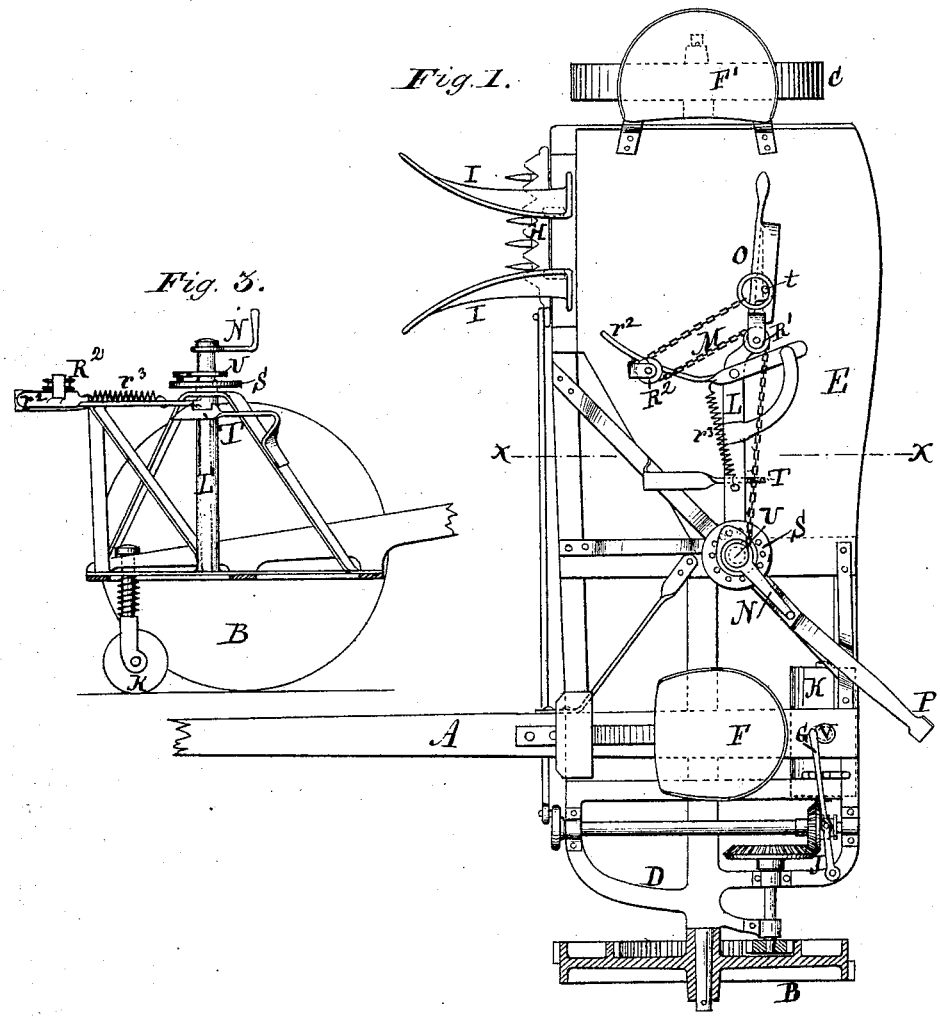
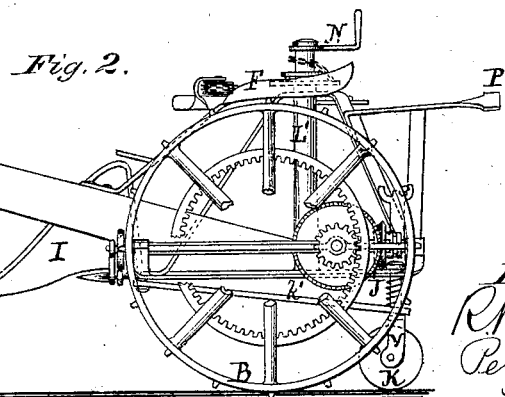
Witnesses.
E. R. Brown.
W. K. Du Hamel
Inventor.
R. B. Robbins
Per H. S. Abbot
Attorney.

UNITED STATES PATENT OFFICE.

RICHARD B. ROBBINS, OF ADRIAN, MICHIGAN.

IMPROVEMENT IN CORN-HARVESTERS.

Specification forming part of Letters Patent No. 149,064, dated March 31, 1874; application filed November 3, 1873.

*To all whom it may concern:*

Be it known that I, RICHARD B. ROBBINS, of Adrian, county of Lenawee and State of Michigan, have invented certain new and useful Improvements in Corn-Harvesters, of which the following is a specification:

My invention relates to certain improvements in machines for harvesting and shocking standing corn; and it consists in the combination, with the derrick or crane, of a chain, an adjustable arm, and a crank-lever, for the purpose of forming the shock and removing it from the platform; and my invention also consists in a spring-lock for holding the shock when bound, in combination with a trip for releasing it from the derrick.

In the accompanying drawing, Figure 1 is a plan or top view of my improved corn-harvester. Fig. 2 is an end view. Fig. 3 is a transverse section, taken in the line $x$ $x$ of Fig. 1, looking toward the driving-wheel.

A represents the tongue of the machine; B, the driving-wheel; C, the loose wheel; D, the frame, and E the platform, all of which parts are of the ordinary construction. F is a seat for the driver, placed over the tongue near one end of the machine, and F' a seat for the operator, placed at the opposite end of the platform over the loose wheel. The cutter-bar H is of the usual construction and operation, and is connected by a pitman with a crank-shaft, operated by gearing J from the driving-wheel, which gearing is thrown in and out of engagement by means of a clutch operated by a lever, G, worked by the driver. I I represent guides extending forward from the platform in front of the cutter-bar, for the purpose of guiding the corn to be formed into shocks. K is a caster-roller, for the purpose of preventing the machine from tilting, and also for leveling the ground, which latter operation may be assisted by placing a cultivator-tooth in front of the roller. This caster-roller is connected with the front part of the frame by a brace-bar, $k'$, through the rear end of which the vertical bolt V moves freely, and to the rear part by a vertical bolt, V, around which is wrapped a spiral spring, for the purpose of allowing the roller to rise and fall in passing over obstructions or uneven ground. L is the derrick, extending horizontally from a vertical standard, L', which may be made adjustable so as to correspond with different heights of corn. M is a chain, one end of which is attached to a drum, U, on the upper end of the standard L'. Under the drum is a circular plate, S, with a series of perforations arranged in a circular form. The drum U has on one side a lug with a pin projecting from its under surface so as to engage with the perforations in the plate S in such a manner as to hold or lock the drum and prevent it from turning. The free end of the chain is passed around a pulley, $R^1$, journaled on the upper side of the derrick, and then around a pulley, $R^2$, journaled on an arm, $r^2$, which is pivoted to said derrick, and provided with a spring, $r^3$, which has a tendency to hold it in a position at about a right angle with the derrick. At the outer end of the derrick L is a spring-lock, O, consisting of a strip of metal bent nearly double, and having near one end a pin, $t$, projecting up through a perforation near the other end. This strip is attached to the derrick in such a manner that when the ends are pressed or closed together the pin $t$ projects above the upper side of the derrick; and when the ends are separated the pin is withdrawn below the surface. P is a trip for engagement with the spring-lock in such a manner as to separate the ends of the strip which compose it, and withdraw the pin $t$, when said lock is swung around in contact with said trip. T is a spring-catch, attached to one of the braces which support the standard L', and serving to hold the derrick in position, as shown in Fig. 1.

The operation is as follows: When a sufficient quantity of corn has been cut to form a shock the operator takes the free end of the chain M and passes it around the shock, and hooks it over the pin $t$ on the spring-lock O. The driver then turns the crank-lever N so as to wind up the chain M on the drum U, and thus bind the shock, and then presses down the crank-lever N on the perforated plate S so as to lock the shock to the derrick L. While in this position the operator on the platform passes a band around the shock and fastens it, and then pushes the shock from the platform; while at the same time the driver, by means of the crank-lever N, swings the derrick around behind the machine until the spring-lock O strikes the trip P, when the chain is thrown off the pin, and the shock is released and drops to the ground. The derrick is then swung forward to its former position, and is held in place by the spring-catch T.

I claim as new, and desire to secure by Letters Patent—

1. The combination of the derrick L, chain M, adjustable arm $r^2$, and crank-lever N, as shown and described, for the purpose specified.

2. The spring-lock O, attached to the derrick L, in combination with the stationary trip P, as shown and described, for the purpose specified.

In testimony that I claim the foregoing as my invention I hereunto affix my signature this 17th day of October, 1873.

RICHARD B. ROBBINS.

Witnesses:
WM. S. GREENLY,
W. STEARNS.